United States Patent [19]

Hwang

[11] Patent Number: 5,788,175
[45] Date of Patent: Aug. 4, 1998

[54] REEL DRIVING APPARATUS FOR MAGNETIC RECORDING AND REPRODUCING APPARATUS

[75] Inventor: Haksun Hwang, Seoul, Rep. of Korea

[73] Assignee: LG Electronics, Inc., Seoul, Rep. of Korea

[21] Appl. No.: 753,303

[22] Filed: Nov. 22, 1996

[30] Foreign Application Priority Data

Nov. 28, 1995 [KR] Rep. of Korea ............................ 44220

[51] Int. Cl.$^6$ .................................................. G11B 15/44
[52] U.S. Cl. ............................ 242/356.5; 242/356.3
[58] Field of Search ........................ 242/356.3, 356.4, 242/356.5, 356.6, 356.7; 360/96.3, 96.4

[56] References Cited

U.S. PATENT DOCUMENTS

| | | | |
|---|---|---|---|
| 4,754,939 | 7/1988 | Kaferbock et al. | 242/356.6 |
| 5,044,218 | 9/1991 | Lee et al. | 242/340 |
| 5,054,711 | 10/1991 | Kato | 242/356.5 |
| 5,230,483 | 7/1993 | Kang | 242/356.5 |
| 5,251,845 | 10/1993 | Ryu | 242/356.3 |
| 5,295,639 | 3/1994 | Kurokawa et al. | 242/356.3 |
| 5,472,151 | 12/1995 | Choi et al. | 360/96.3 |
| 5,501,408 | 3/1996 | Kang et al. | 242/356.5 |

*Primary Examiner*—John P. Darling
*Attorney, Agent, or Firm*—Birch, Stewart, Kolasch & Birch, LLP

[57] ABSTRACT

A reel driving apparatus for a magnetic recording and reproducing apparatus provides the capability of easily changing the operational mode between a reproducing mode and a reverse reproducing mode without departing a pinch roller from a shaft of a capstan motor. The reel driving apparatus includes a reversely rotatable motor, a slip mechanism for receiving a rotational force from the motor and generating a predetermined torque in cooperation with a predetermined slip, a rotational force relay unit connected to the slip mechanism for receiving the rotational force from the slip mechanism, and a switching unit for performing an operation in order for the rotational force relay unit to be selectively connected with either a supply reel driving unit or a take-up reel driving unit, whereby the rotational force from the slip mechanism is selectively transferred to either the supply reel driving unit or the take-up reel driving unit by switching the rotational force relay unit.

12 Claims, 5 Drawing Sheets

REEL DRIVING APPARATUS FOR MAGNETIC RECORDING AND REPRODUCING APPARATUS

BACKGROUND OF THE INVENTION

1. Field of the Invention

The present invention relates to a reel driving apparatus for a magnetic recording and reproducing apparatus, and particularly to an improved reel driving apparatus for a magnetic recording and reproducing apparatus which is capable of more easily changing the operational mode between a reproducing mode and a reverse reproducing mode without departing a pinch roller from a shaft of a capstan motor.

2. Description of the Conventional Art

FIG. 1 is a plan view illustrating the construction of a conventional reel driving apparatus for a magnetic recording and reproducing apparatus, and FIG. 2 is a cross-sectional view illustrating the construction of a conventional reel driving apparatus for a magnetic recording and reproducing apparatus.

As shown therein, in the conventional reel driving apparatus for a magnetic recording and reproducing apparatus, a rotational force from a capstan shaft 1 is transferred to a driving pulley 3 through a belt 2. The rotational force transferred to the driving pulley 3 is transferred to an idler gear 4' through a predetermined path. The idler gear 4' receiving the rotational force is selectively intermeshed with a gear 5a of a supply reel 5 or a gear 6 of a take-up reel 6a, for thus selectively driving the supply reel 5 and the take-up reel 6.

The construction of the reel driving apparatus for a magnetic recording and reproducing apparatus will now be explained in more detail.

As shown in FIG. 2, a driving pulley 3 is inserted onto a lower portion of a fixing shaft 8 fixed to a portion of a main chassis (not shown). The driving pulley 3 is connected with a capstan pulley 1' inserted onto a lower portion of the capstan shaft 1 in cooperation with a belt 2. A holder 10 having a felt 9 formed on the upper surface thereof is disposed in a lower portion of the driving pulley 3. A circular plate 12 having a belt 11 formed on the lower surface thereof is disposed in an upper portion of the driving pulley 3. In the drawings, reference numeral 7 denotes a bracket.

A rotating member 13 and a central gear 14 which smoothly abut with each other by a predetermined abutting mechanism therebetween are sequentially disposed in an upper portion of the circular plate 12. Compression coil springs 15 and 16 are arranged between the circular plate 12 and the rotating member 13, and between the circular plate 12 and the central gear 14, respectively. With the above-described construction, when the rotating member 13 is lowered by a predetermined lever (not shown), the rotating member 13 becomes intermeshed with the driving pulley 3, and then the rotating member is rotated by the driving force of the driving pulley 3.

An idler arm 17 of the idler assembly 4 is arranged between the central gear 14 and the bracket 7. An upper end of the idler arm 17 is fixed to the fixing shaft 18. The idler gear 4' intermeshed with the central gear 14 in cooperation with a washer is inserted onto the fixing shaft 18. A compression coil spring 21 and a washer 22 are inserted onto a lower portion of the fixing shaft 18 onto which the idler gear 4' is inserted. Therefore, the compression coil spring 21 and the washer 22 elastically and upwardly support the idler gear 4'.

In FIG. 1, reference numeral 20 denotes a pinch roller.

The operation of the conventional reel driving apparatus for a magnetic recording and reproducing apparatus will now be explained with reference to FIGS. 1 and 2.

First, in the case that the operational mode of the conventional magnetic recording and reproducing apparatus is in the reproducing mode, the capstan shaft 1 rotates clockwise. The rotational force from the capstan shaft 1 is transferred to the driving pulley 3 through the belt 2. Here, a friction torque and predetermined slippage occur between the holder 10, the driving pulley 3, and the circular plate 12 in cooperation with the felts 9 and 11.

Due to the above-described friction torque, the rotational force transferred to the driving pulley 3 is transferred to the idler gear 4' of the idler assembly 4 through a predetermined path. The idler gear 4' is intermeshed with the gear 6a of the take-up reel 6 and causes the take-up reel 6 to rotate clockwise.

In the above-described state, in order to convert the operational mode from the reproducing mode to the reverse reproducing mode, when pressing a predetermined button, the capstan shaft 1 is rotated counterclockwise through various circuit-based operational processes. Here, the operation is performed in the order which is the same as the reproducing mode, but the rotational direction is reversed with respect to the reproducing mode. Therefore, the idler arm 17 is rotated counterclockwise, and the idler gear 4' departs from the take-up reel 6, and the idler gear 4' becomes intermeshed with the gear 5a of the supply reel 5, and then the rotational force is transferred to the supply reel 5.

Namely, since the idler gear 4' is arranged in order for the rotational force to be selectively transferred to the take-up reel 6 or the supply reel 5, when the idler gear 4' moves from the take-up reel 6 to the supply reel 5, or from the supply reel 5 to the take-up reel 6, the rotational force may not be transferred to the take-up reel 6 or the supply reel 5 when the idler gear 4' moves to either the take-up reel 6 or the supply reel 5 for a predetermined time because there is a predetermined distance between the take-up reel 6 and the supply reel 5. Therefore, the tape reversely released from the capstan shaft 1 and the pinch roller 20 may not be wound for a predetermined time. In addition, the tape may lose contact with the outer surface of a head drum, which in turn degrades the quality of picture.

In order to overcome the above-described problems, a method for departing the pinch roller 20 from the capstan shaft 1 in order to prevent the reverse release when the idler gear 4' is moved to either the supply reel 5 or the take-up reel 6 was proposed in the industry. However, the above-described method has disadvantages in sufficiently preventing the reverse release of the tape. The above-described problems occur when converting the operational mode from the reverse mode to the reproducing mode as well.

SUMMARY OF THE INVENTION

Accordingly, it is an object of the present invention to provide a reel driving apparatus for a magnetic recording and reproducing apparatus which overcomes the problems encountered in the conventional reel driving apparatus for a magnetic recording and reproducing apparatus.

It is another object of the present invention to provide a reel driving apparatus for a magnetic recording and reproducing apparatus which is capable of more easily changing the operational mode between a reproducing mode and a reverse reproducing mode without departing a pinch roller from a shaft of a capstan motor.

To achieve the above objects, in accordance with a first embodiment of the present invention, there is provided a reel driving apparatus for a magnetic recording and reproducing apparatus which includes a reversely rotatable motor, a slip mechanism for receiving a rotational force from the motor and generating a predetermined torque in cooperation with a predetermined slip, rotational force relay means connected to the slip mechanism for receiving the rotational force from the slip mechanism, and switching means for performing an operation in order for the rotational force relay means to be selectively connected with either a supply reel driving unit or a take-up reel driving unit, whereby the rotational force from the slip mechanism is selectively transferred to either the supply reel driving unit or the take-up reel driving unit by switching the rotational force relay unit.

To achieve the above objects, in accordance with a second embodiment of the present invention, there is provided a reel driving apparatus for a magnetic recording and reproducing apparatus which includes a reversely rotatable motor, a slip mechanism for receiving a rotational force from the motor and generating a predetermined torque in cooperation with a predetermined slip, rotational force relay means connected to the slip mechanism and inserted onto a shaft, and switching means for moving between a first rotational force transfer position for transferring the rotational force from the slip mechanism to the take-up reel and a second rotational force transfer position for transferring the rotational force from the slip mechanism to the supply reel.

Additional advantages, objects and features of the invention will become more apparent from the description which follows.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8 through 10 are views illustrating an operational state of a reel driving apparatus for a magnetic recording and reproducing apparatus according to the present invention, of which:

FIG. 8 is a cross-sectional view illustrating an operational state in the reproducing mode of a reel driving apparatus;

FIG. 9 is a cross-sectional view illustrating an operational state in the reverse reproducing mode from the reproducing mode of a reel driving apparatus according to the present invention; and FIG. 10 is a cross-sectional view illustrating an operation in the reverse reproducing mode of a reel driving apparatus.

DETAILED DESCRIPTION OF THE INVENTION

Figure 1:
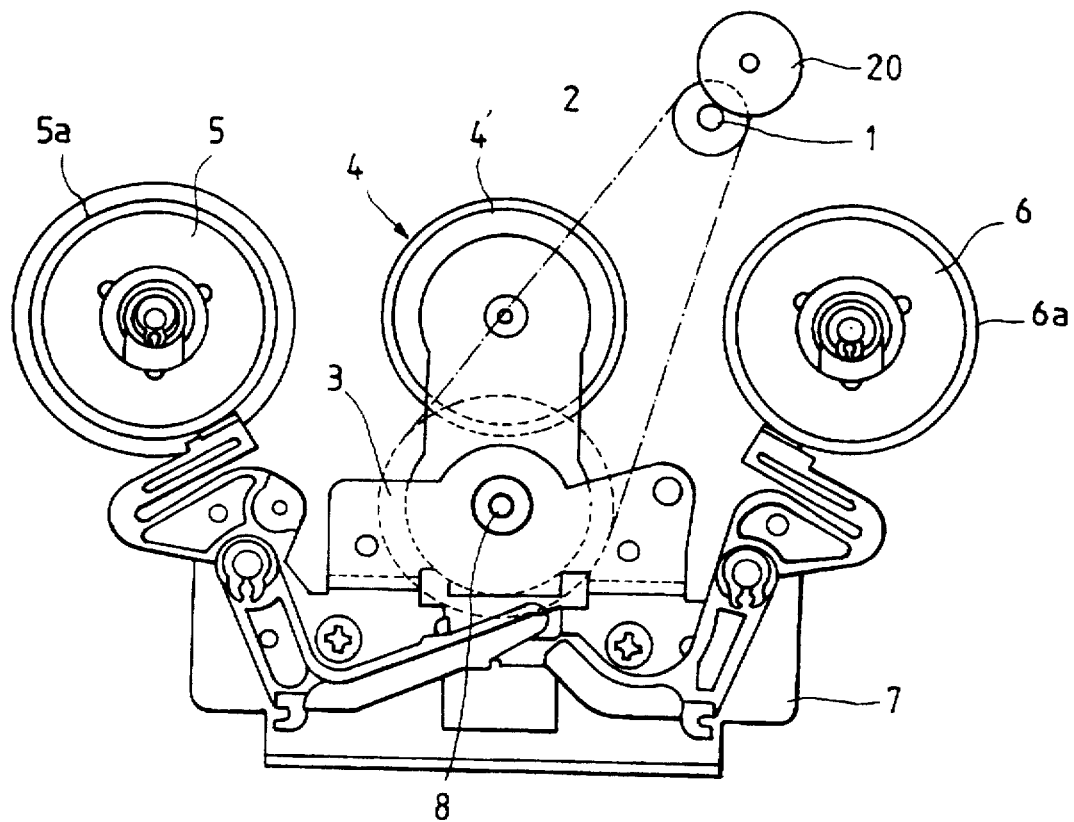
FIG. 1 is a plan view illustrating the construction of a conventional reel driving apparatus for a magnetic recording and reproducing apparatus.
Figure 2:
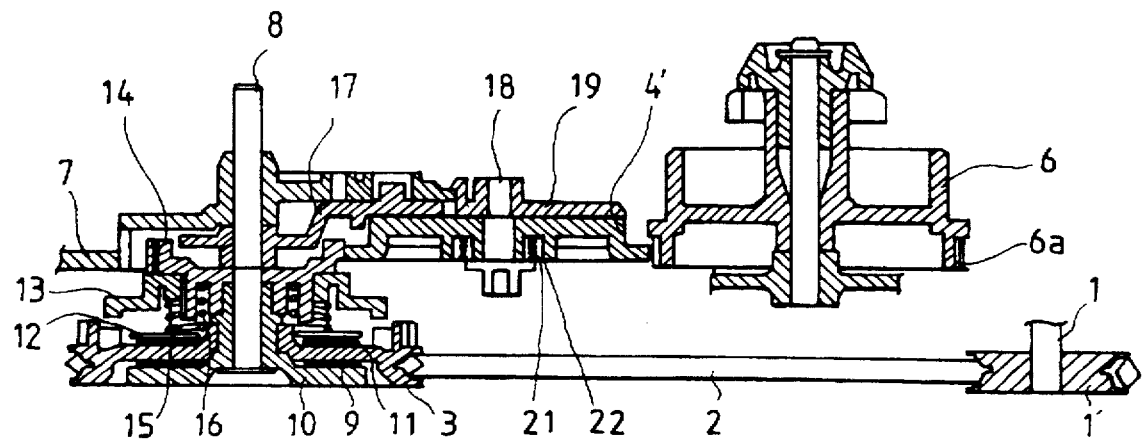
FIG. 2 is a cross-sectional view illustrating the construction of a conventional reel driving apparatus for a magnetic recording and reproducing apparatus.

The construction of the reel driving apparatus for a magnetic recording and reproducing apparatus according to the present invention will now be explained with reference to FIGS. 3 through 7.

First, a capstan motor 31 which is normally and reversely rotated, is arranged in the deck mechanism. A slip mechanism 40 is provided for receiving a rotational force from the capstan motor 31 through a belt 33 and for generating a predetermined torque generated in cooperation with a slippage. A rotational force relay unit 50 connected with the slip mechanism 40 is provided for receiving the rotational force from the slip mechanism 40. A switching unit 60 is provided for switching the rotational force relay unit 50 between a supply reel driving unit 70 and a take-up reel driving unit 80 by using a predetermined driving unit (not shown). With the above-described constructions, the switching unit 60 changes the position of the rotational force relay unit 50, so that the rotational force from the slip mechanism 40 is transferred to either the supply reel driving unit 70 or the take-up reel driving unit 80.

In addition, the slip mechanism 40 includes the following: a shaft 40S disposed in a lower portion of a bracket 35 fixed to a portion of the main chassis 30; a holder 41 inserted onto an end portion of the shaft 40S and having a friction member 41' formed on the upper surface thereof; a slip pulley 42 rotatably disposed in the holder 41 and driven by the belt 33 drivingly connected with the capstan motor 31; a connection gear 46 inserted onto the shaft 40S and rotated together with the holder 41; a lifting/lowering member 47, which is lifted/lowered by a predetermined member and is rotated integrally with the connection gear 46, for selectively transferring the rotational force from the slip pulley 42 to the connection gear 46; and a rotational plate 43 including a friction member 43' formed on the lower surface thereof, with the upper surface of the rotational plate 43 being elastically supported by elastic members 44 and 45 with respect to the lifting/lowering member 47 and the connection gear 46.

Figure 5:
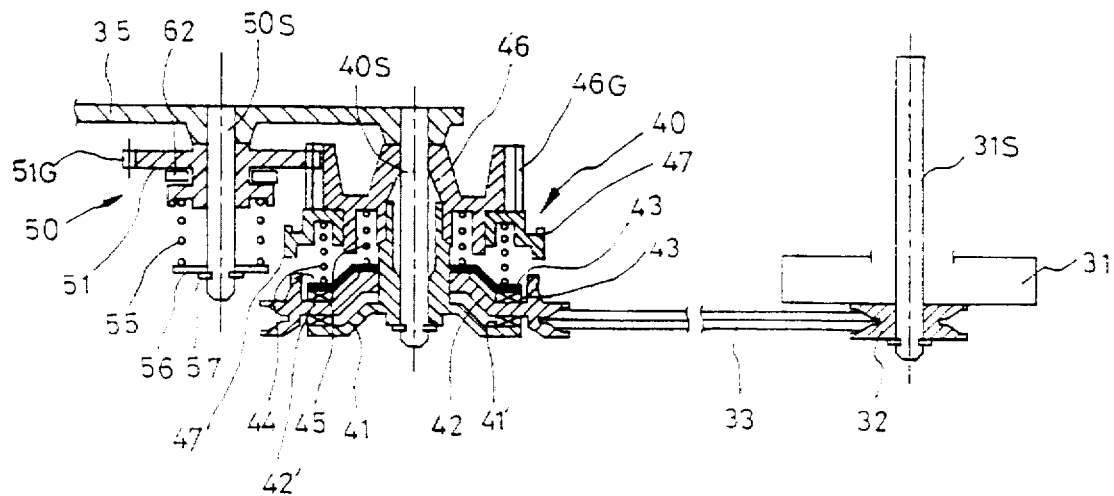
FIG. 5 is a cross-sectional view illustrating the construction of a slip mechanism of a reel driving apparatus for a magnetic recording and reproducing apparatus according to the present invention.

As shown in FIG. 5, in the slip mechanism 40, the upper surface of the slip pulley 42 driven by the belt 33 contacts with the friction member 43' attached to the rotational plate 43, and the lower surface thereof contacts with the friction member 41' attached to the holder 41, for thus transferring a predetermined torque which is generated in cooperation with the slip therebetween to the holder 41. In addition, a wider width gear portion 46G is formed on the outer circumferential surface of the connection gear 46.

In addition, the rotational force relay unit 50 includes an intermediate gear 51 inserted onto the shaft 50S disposed in a portion of the bracket 35 and intermeshed with the connection gear 46, and an elastic support unit 55 for elastically supporting the intermediate gear 51 toward the bracket 35.

The intermediate gear 51 includes a gear 51G intermeshed with the wider width gear portion of the connection gear 46, and a lifting/lowering driving groove 52 is formed between the intermediate gear 51 and the elastic support unit 55. In the lifting/lowering driving groove 52, a switching arm 62 of a switching lever 61 of the switching unit 60, which will be described later, is inserted. In addition, one end of the elastic support unit 55 supported by the washers 56 and 57 inserted onto the end portion of the shaft 50S.

The switching unit 60 includes the switching lever 61 hinged to the bracket 35 for lifting/lowering the intermediate gear 51, and a driving plate 65, which is driven by a predetermined driving member (not shown), having a driving section 66 for vertically moving the switching lever 61.

The switching lever 61 includes a switching arm 62 which is inserted into the lifting/lowering driving groove 52 formed in the intermediate gear 51, and an operational section 63 mating with the driving section 66 of the driving plate 65 and formed in the lower end portion thereof. The operational section 63 is almost vertical with respect to the switching arm 62.

The driving section 66 is protrudely formed on the driving plate 65 which is horizontally moved by a predetermined driving member (not shown), and contacts with the operational section 63 of the switching lever 61, for thus driving the switching lever 61.

Inclined portions 63' and 66' are formed in the operational section 63 and the driving section 66, respectively, so that an easier operation between the operational section 63 of the switching lever 61 and the driving section 66 of the driving plate 65 is achieved.

The constructions of the reel driving apparatus for a magnetic recording and reproducing apparatus according to the present invention will now be explained in more detail with reference to the accompanying drawings.

The supply and take-up reel driving units 70 and 80 include supply and take-up reel driving gears 71 and 81 which are operably inserted onto the shafts 70S and 80S, respectively, which are fixed to the bracket 35. The shafts 70S and 80S are arranged near a supply reel 75 and a take-up reel 85, respectively, and are drivingly connected with the same.

The supply reel driving gear 71 intermeshed with the supply reel 75 includes a bigger gear section 71G' intermeshed with the gear 51G of the intermediate gear 51, and a smaller gear section 71G intermeshed with the supply reel 75. In addition, the take-up reel driving gear 81 intermeshed with the take-up reel 85 includes a gear 81G intermeshed with the take-up reel 85. The arranging method of the supply and take-up reel driving gears 71 and 81 are not limited thereto. Namely, the positions of the supply reel driving gear 71 and the take-up reel driving gear 81 may be changed.

In the drawings, reference numeral 31S denotes a capstan shaft, 32 denotes a capstan pulley, 34 denotes a pinch roller, 42' denotes a protrusion of the slip pulley 42, 47' denotes a protrusion of the lifting/lowering member 47, 57 denotes a washer, and 61H denotes a hinge pin.

The operation of the reel driving apparatus for a magnetic recording and reproducing apparatus according to the present invention will now be explained with reference to FIGS. 8 through 10.

Figure 8:
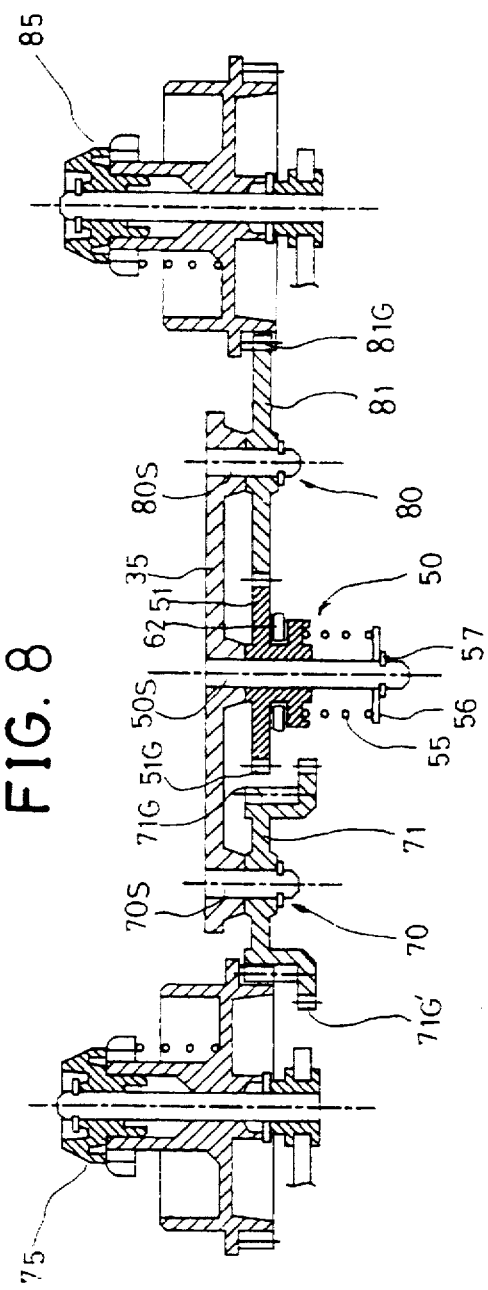

FIG. 8 is a cross-sectional view illustrating an operational state in the reproducing mode of a reel driving apparatus. FIG. 9 is a cross-sectional view illustrating an operational state in the reverse reproducing mode from the reproducing mode of a reel driving apparatus according to the present invention, and FIG. 10 is a cross-sectional view illustrating an operational view in the reverse reproducing mode of a reel driving apparatus.

Figure 3:
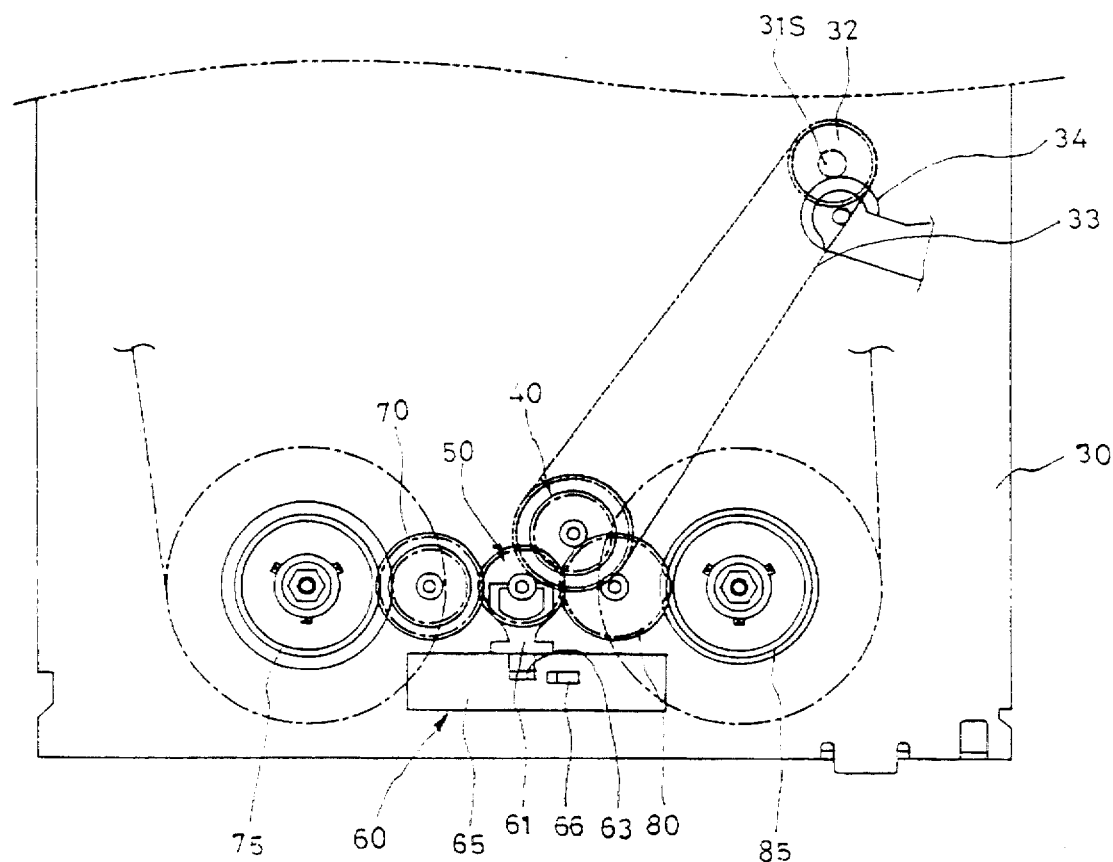
FIG. 3 is a plan view illustrating major components of a deck in which a reel driving apparatus for a magnetic recording and reproducing apparatus according to the present invention is disposed and an operational state in the reproducing mode of the system.
Figure 4:
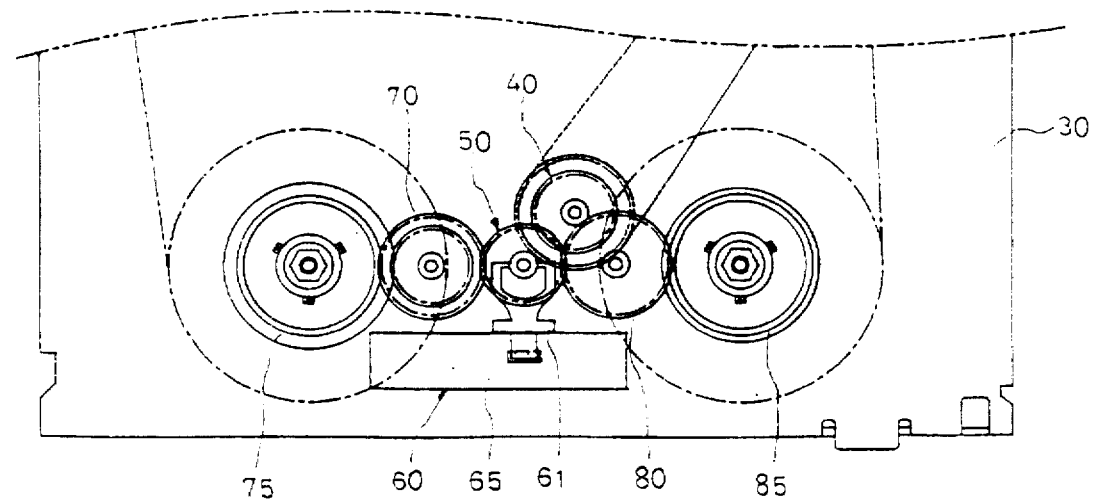
FIG. 4 is a plan view illustrating major components of a deck in which a reel driving apparatus for a magnetic recording and reproducing apparatus according to the present invention is disposed and an operation state in the reverse reproducing mode of the system.

First, the operation of the reel driving apparatus in the reproducing mode will be explained. The rotational force in the reproducing mode is performed in the following order. The capstan motor 31, the belt 33, the slip pulley 42, the connection gear 46, the intermediate gear 51, the take-up reel driving gear 81, and the take-up reel 85. The intermediate gear 51 of the driving force relay unit 50 is elastically supported toward the bracket 35 by the elastic support unit 55, and the gear 51G of the intermediate gear 51 is intermeshed with the gear 81G of the take-up reel driving gear 81, and thus the take-up reel 85 is rotated. Here, the operational section 63 of the switching lever 61 and the driving section 66 of the driving plate 65, as shown in FIG. 3, are spaced-apart by a predetermined distance.

The mode change from the reproducing to the reverse reproducing mode is performed as follows.

Figure 6:
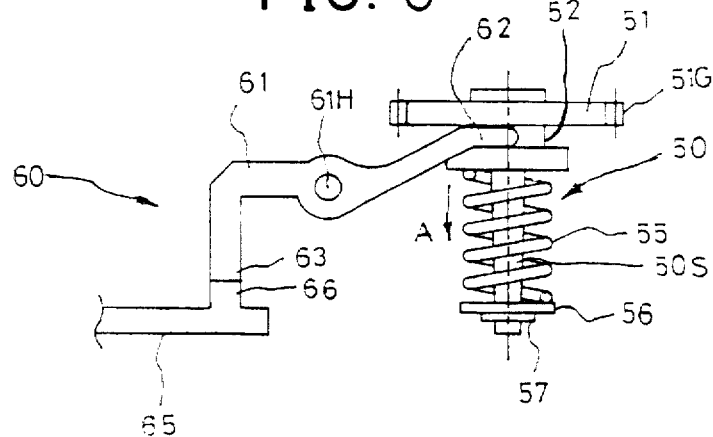
FIG. 6 is a side view illustrating a switching unit and a driving force relay unit of a reel driving apparatus for a magnetic recording and reproducing apparatus according to the present invention and an operational state thereof.
Figure 7:
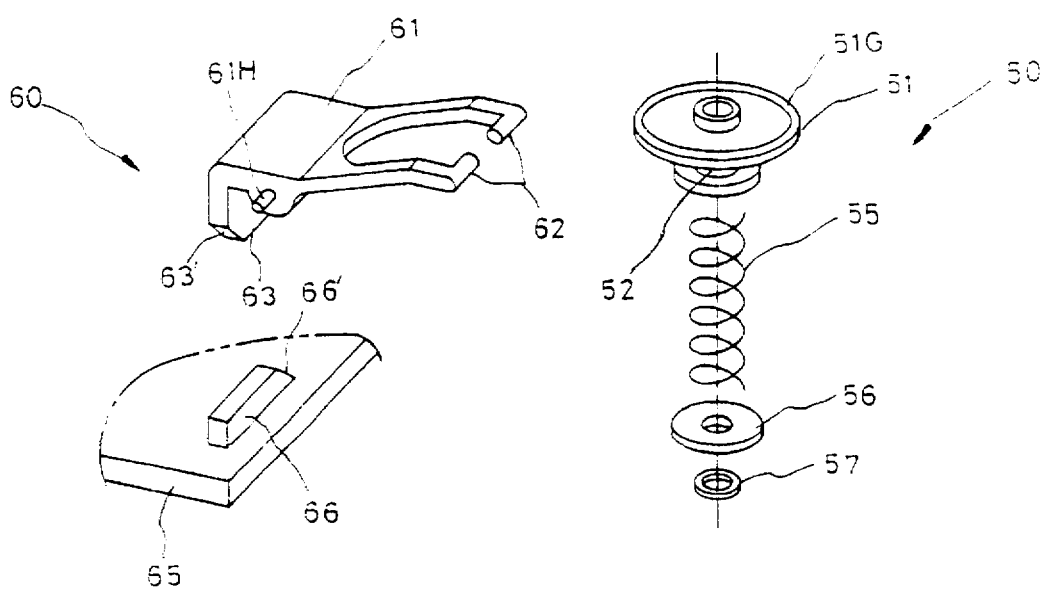
FIG. 7 is an exploded view illustrating a switching unit and a driving force relay unit of a reel driving apparatus for a magnetic recording and reproducing apparatus according to the present invention.
Figure 9:
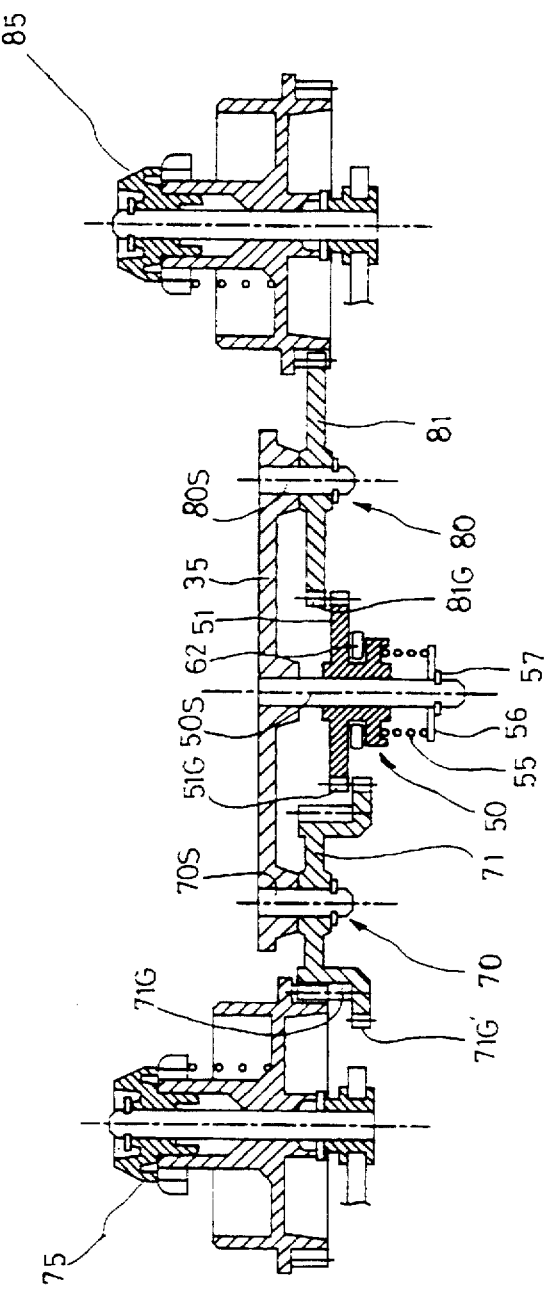

As shown in FIGS. 6, 7, and 9, the driving section 66 of the driving plate 65 and the operational section 63 of the switching lever 61 come into sliding contact with each other in cooperation with the guiding operation of the inclined section 63' of the switching lever 61 and the inclined section 66' of the driving plate 65 in accordance with the movement of the driving plate 65, for thus tilting the switching lever 61 with respect to the hinge 61H at a predetermined angle. In this state, the switching arm 62 formed at one end of the switching lever 61 moves in the direction indicated by the arrow "A" in FIG. 6. In addition, the switching arm 62 overcomes the elastic force of the elastic support unit 55, whereby the intermediate gear 51 downwardly moves along the shaft SOS.

Figure 10:
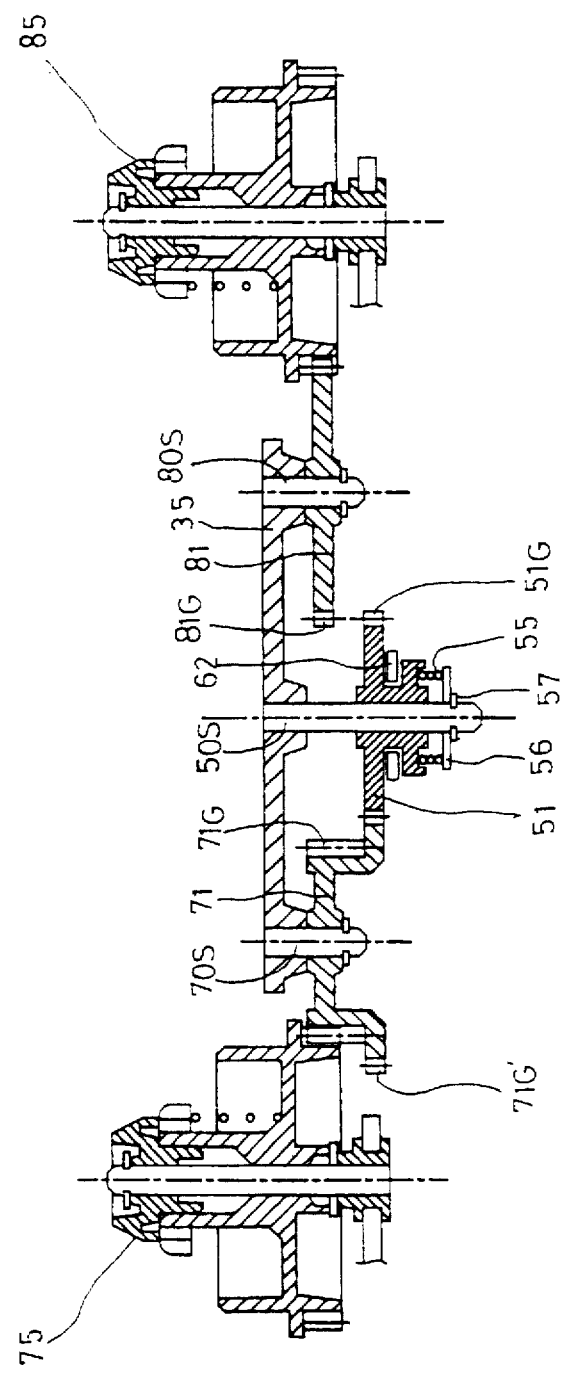

As shown in FIG. 10, continuously from the operation as shown in FIG. 9, when the movement of the driving plate 65 is continued, and the upper surface of the driving section 66 and the operational section 63 of the switching lever 61 come into contact with each other, the switching arm 62 of the switching lever 61 moves the intermediate gear 51 toward the lower portion of the shaft 50S. Here, the rotational force is transferred in the following order: The capstan motor 31, the belt 33, the slip pulley 42, the holder 41, the connection gear 46, the intermediate gear 51, the supply reel driving gear 71, and the supply reel 75.

The wider width gear portion 71G' of the supply reel driving gear 71 and the gear 51G of the intermediate gear 51 are intermeshed with each other, whereby the rotational force is transferred to the supply reel 75.

Here, the smaller gear 71G of the supply reel driving gear 71 is always intermeshed with the supply reel 75.

In the reproducing and reverse reproducing modes, the intermediate gear 51 is lifted/lowered by the switching lever 61 for transferring the rotational force. Here, the gear 51G of the intermediate gear 51 is intermeshed with the wider width gear portion 46G of the connection gear 46. Therefore, even when the intermediate gear 51 moves vertically, the gear 51G of the intermediate gear 51 moves vertically along the wider width gear portion 46G, for thus always obtaining an intermeshing relationship therebetween.

In addition, when the operational mode is changed from the reverse reproducing mode to the reproducing mode, the driving section 66 of the driving plate 65 and the operational section 63 of the switching lever are separated, and the intermediate gear 51 moves toward the bracket 35 in cooperation with the elastic force of the elastic support unit 55, so that the gear 51G of the intermediate gear 51 becomes intermeshed with the gear 81G of the take-up reel driving gear 81.

Meanwhile, in the high speed take-up mode or the high speed take-up mode, the lifting/lowering unit 47 is lowered by a predetermined member (not shown), and the protrusion 42' of the slip pulley 42 and the protrusion 47' of the lifting/lowering unit 47 are engaged, so that the rotational force from the slip pulley 42 is directly transferred to the connection gear 46 not through the friction members 41' and 43', so that the intermediate gear 51 receives a higher torque.

As described above, the reel driving apparatus for a magnetic recording and reproducing apparatus according to the present invention is directed to changing the rotational force transfer direction between the reproducing mode the reverse reproducing mode by using the driving plate without using the capstan motor. Therefore, the reel driving apparatus does not need to depart the pinch roller from the capstan motor. When the capstan motor is rotated counterclockwise, the operational force from the capstan motor is transferred to the opposite reel, for thus winding the tape onto the opposite reel.

Therefore, when changing the operational mode between the reproducing mode and the reverse reproducing mode, the reel drive apparatus does not need to depart the pinch roller from the capstan motor compared to the conventional art, so that the operational process of the system is made simpler, and the running condition of the tape is made stable. In particular, since an idler, an expensive friction clutch and other components related thereto are not used, the reel driving apparatus of the present invention reduces the fabrication cost, and improves the reliability of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A reel driving apparatus for a magnetic recording and reproducing apparatus, comprising:
    a motor;
    a slip mechanism for receiving a rotational force from the motor and generating a predetermined torque in cooperation with a predetermined slip;
    rotational force relay means connected to the slip mechanism and receiving and relaying a rotational force from the slip mechanism; and
    switching means for selectively connecting the rotational force relay means with either a supply reel driving unit or a take-up reel driving unit, said switching means including
    a switching member for vertically moving the rotational force relay means; and
    a driving member for driving the switching lever, whereby the rotational force from the slip mechanism is selectively transferred to either the supply reel driving unit or the take-up reel driving unit by switching the rotational force relay means.

2. The apparatus of claim 1, wherein said rotational force relay means includes:
    an intermediate gear inserted onto a shaft disposed in a portion of a bracket; and
    elastic support means for elastically supporting the intermediate gear.

3. The apparatus of claim 2, wherein said elastic support means is directed to elastically supporting the intermediate gear toward the bracket.

4. The apparatus of claim 2, wherein said supply and take-up reel driving units are reel driving gears which are rotatably inserted onto a shaft arranged in the bracket.

5. The apparatus of claim 4, wherein one of said reel driving gears includes a wider width gear portion intermeshed with the intermediate gear of the rotational force relay means, and a smaller gear portion intermeshed with the supply reel.

6. The apparatus of claim 1, wherein said switching member includes a switching arm formed at one end thereof and inserted into a lifting/driving groove formed in an intermediate gear, and an operational section formed at another end thereof for being operable in cooperation with a driving section of the driving member.

7. The apparatus of claim 6, wherein said operational section of the switching member and a driving section include inclined portions, respectively.

8. A reel driving apparatus for a magnetic recording and reproducing apparatus, comprising:
    a motor;
    a slip mechanism for receiving a rotational force from the motor and generating a predetermined torque in cooperation with a predetermined slip;
    rotational force relay means connected to the slip mechanism and inserted onto a shaft for receiving and relaying a rotational force of the slip mechanism; and
    switching means for vertically moving the rotational force relay means alone the shaft between a first rotational force transfer position for transferring the rotational force from the slip mechanism to a take-up reel and a second rotational force transfer position for transferring the rotational force from the slip mechanism to a supply reel.

9. The apparatus of claim 8, wherein said switching means includes:
    a switching member rotatably disposed in a bracket for lifting/lowering an intermediate gear of the rotational force relay means; and
    a driving member for lifting/lowering the switching member.

10. The apparatus of claim 9, wherein said switching member includes:
    a switching arm formed at one end thereof and inserted into a lifting/lowering driving groove formed in the intermediate gear; and
    an operational section formed at another end thereof and mating with a driving section of the driving member.

11. The apparatus of claim 10, wherein said operational section of the switching member and the driving section of the driving member include inclined portions, respectively.

12. The apparatus of claim 10, wherein said operational section of the switching member and the driving section of the driving member include inclined portions, respectively.

* * * * *